United States Patent
Protola et al.

(10) Patent No.: US 8,068,136 B2
(45) Date of Patent: Nov. 29, 2011

(54) METHOD AND SYSTEM FOR DETERMINING ANGULAR POSITION OF AN OBJECT

(75) Inventors: Joseph G. Protola, Clearwater, FL (US); John S. White, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 1231 days.

(21) Appl. No.: 11/749,309

(22) Filed: May 16, 2007

(65) Prior Publication Data

US 2008/0284790 A1 Nov. 20, 2008

(51) Int. Cl.
*H04N 5/225* (2006.01)
*G01C 19/00* (2006.01)

(52) U.S. Cl. ........................ 348/169; 702/151
(58) Field of Classification Search .................. 348/169; 702/151

See application file for complete search history.

(56) References Cited

U.S. PATENT DOCUMENTS

| | | | |
|---|---|---|---|
| 5,319,577 A | 6/1994 | Lee | |
| 5,396,559 A | 3/1995 | McGrew | |
| 5,861,876 A | 1/1999 | Nakayama | |
| 6,099,134 A | 8/2000 | Taniguchi et al. | |
| 6,108,594 A | 8/2000 | Didinsky et al. | |
| 6,172,665 B1 | 1/2001 | Bullister | |
| 6,545,676 B1 | 4/2003 | Ryan et al. | |
| 7,593,829 B2 * | 9/2009 | White | 702/150 |
| 2004/0239844 A1 * | 12/2004 | Kanoh et al. | 349/113 |
| 2005/0264834 A1 | 12/2005 | Asai et al. | |
| 2006/0058978 A1 | 3/2006 | Kurth et al. | |
| 2008/0144111 A1 | 6/2008 | Lee et al. | |

FOREIGN PATENT DOCUMENTS

JP 9130602 5/1997

OTHER PUBLICATIONS

European Patent Office, "European Search Report", Jul. 15, 2009, Published in: EP.

* cited by examiner

*Primary Examiner* — Larry Donaghue
(74) *Attorney, Agent, or Firm* — Fogg & Powers LLC

(57) ABSTRACT

A method and system for determining the angular position of an object are disclosed. As one example, a method for determining the angular position of an object is disclosed, which includes the steps of obtaining data representing an image of a surface area of the object, the image including a plurality of dots, determining a set of coordinates for each dot of the plurality of dots, selecting a predetermined number of dots of the plurality of dots, comparing the predetermined number of dots with a plurality of dots stored in a dot map, responsive to the comparing step, if the predetermined number of dots substantially match the plurality of dots stored in the dot map, selecting the predetermined number of dots, and forming a coordinate transformation matrix representing a transformation from a coordinate frame associated with a position of the predetermined number of dots at the surface of the object to a coordinate frame associated with a position of the image of the surface area of the object.

20 Claims, 2 Drawing Sheets

METHOD AND SYSTEM FOR DETERMINING ANGULAR POSITION OF AN OBJECT

RELATED APPLICATION(S)

The present application is related to commonly assigned U.S. patent application Ser. No. 11/749,312 entitled "METHOD FOR GENERATING PSEUDO-RANDOM PATTERN DESIGNS FOR OPTICAL POSITION DETERMINATION SYSTEMS", filed on the same date herewith, which is incorporated herein by reference in its entirety.

FIELD OF THE INVENTION

The present invention relates to the position determination field, and more particularly, but not exclusively, to a method and system for determining the angular position of an object.

BACKGROUND OF THE INVENTION

Contemporary precision inertial navigation systems have eliminated the need for gimbals by supporting the inertial sensor assembly with a spherically-shaped gas-supported bearing. The gas-supported bearing allows rotation of the inertial sensor assembly in all axes with no wear due to contact between the rotating surfaces. During the flight of a craft, the angular position of the inertial sensor assembly (sometimes also referred to as the attitude, or roll, pitch and yaw of the inertial sensor assembly) relative to the frame of the craft must be monitored at all times. However, physical contact with the freely-rotating, gas bearing-supported inertial sensor assembly is undesirable. Consequently, a pressing need exists for a position determination method and system that can be used for sensing the angular position of the inertial sensor assembly without physically contacting the assembly.

Similarly, in other applications, such as, for example, in a manufacturing assembly line, objects being manufactured are scanned to determine their position on the assembly line's conveyor. A robotic system down-line from the scanner, and in communication with the scanner, is implemented to reposition the objects if necessary. Physical contact between the scanner and the objects is undesirable. Consequently, a need also exists for a position determination method and system that can be used for sensing the angular position of an object on an assembly line without physically contacting the object.

SUMMARY OF THE INVENTION

In a first example embodiment, a method for determining the angular position of an object is provided. The method includes the steps of obtaining data representing an image of a surface area of the object, the image including a plurality of dots, determining a set of coordinates for each dot of the plurality of dots, selecting a predetermined number of dots of the plurality of dots, comparing the predetermined number of dots with a plurality of dots stored in a dot map, responsive to the comparing step, if the predetermined number of dots substantially match the plurality of dots stored in the dot map, selecting the predetermined number of dots, and forming a coordinate transformation matrix representing a transformation from a coordinate frame associated with a position of the predetermined number of dots at the surface of the object to a coordinate frame associated with a position of the image of the surface area of the object.

In a second example embodiment, a method for determining the attitude of a moving ball-shaped object is provided. The method includes the steps of obtaining image data from a digital camera, the data representing an image of a surface area of the ball-shaped object, the image including a plurality of dots on a surface of the ball-shaped object, determining a set of coordinates for dot of the plurality of dots, selecting three dots of the plurality of dots, calculating a plurality of polar coordinates for each of the three dots, comparing the polar coordinates for each of the three dots with polar coordinates for dots stored in a predetermined map, responsive to the comparing step, if the polar coordinates of the three dots substantially match the three dots stored in the map, selecting the polar coordinates of the three dots, and forming a coordinate transformation matrix representing a transformation from a coordinate frame associated with an attitude of the three dots at the surface of the object to a coordinate frame associated with a position of the image of the surface area of the ball-shaped object.

In a third example embodiment, a system for determining the angular position of an object is provided. The system includes a digital camera, and a digital processor unit coupled to the digital camera. The digital camera is configured to receive, from the digital camera, data representing an image of a surface area of the object, the image including a plurality of dots, determine a set of coordinates for each dot of the plurality of dots, select a predetermined number of dots of the plurality of dots, retrieve a stored plurality of dots, compare the predetermined number of dots with the retrieved plurality of dots, if the predetermined number of dots substantially match the plurality of retrieved dots, select the predetermined number of dots, and form a coordinate transformation matrix representing a transformation from a coordinate frame associated with an attitude of the predetermined number of dots at the surface of the object to a coordinate frame associated with an attitude of the image of the surface area of the object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
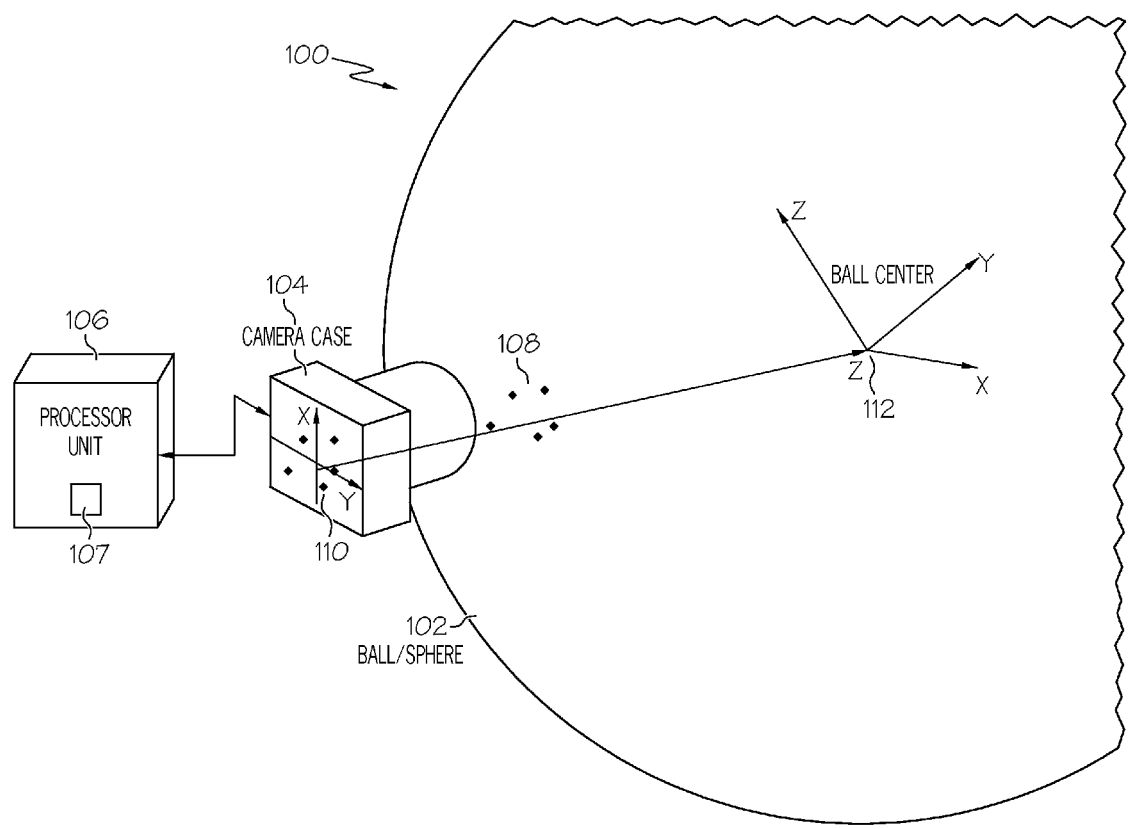
FIG. 1 is a pictorial diagram depicting a system for determining the angular position of an object, in accordance with one or more example embodiments of the present invention.

With reference now to the figures, FIG. 1 is a pictorial diagram depicting a system 100 for determining the angular position of an object, in accordance with one or more example embodiments of the present invention. For at least one example embodiment, system 100 may represent an optical angular position readout system, which is capable of achieving one or more position readouts for an object without touching the object. For example, system 100 may be used to implement all or part of an attitude determination system for an inertial navigation system. As another illustrative example, system 100 may be used to implement a system for determining the angular position of one or more objects on an assembly line.

For the illustrative embodiments depicted by FIG. 1, system 100 may include a digital camera 104 suitably connected for communications with a digital processor unit 106. For example, digital camera 104 and digital processor unit 106 may be implemented as part of an optical angular readout system. Essentially, the digital camera 104 may be configured and positioned to observe a pseudo-random pattern of dots applied to a moving spherical object (e.g., ball). A pertinent portion of an example spherical object is indicated generally by numeral 102. For example, the spherical object (e.g., ball) may be configured to move in accordance with the attitude of a craft in flight. An illustrative example of such a pseudo-random pattern of dots applied to the surface of the spherical object 102 is indicated by numeral 108. Notably, in some embodiments, the object being observed by digital camera 104 may be a non-spherical object, such as, for example, a cylindrical surface, flat surface, rectangular surface, polygonal surface, or a combination of such surfaces. In that regard, exemplary methods for generating such pseudo-random patterns of dots on spherical or non-spherical objects are disclosed and claimed in the above-described related application entitled, "METHOD FOR GENERATING PSEUDO-RANDOM PATTERN DESIGNS FOR OPTICAL POSITION DETERMINATION SYSTEMS".

The digital processor unit 106 may be a computer (e.g., general purpose, personal, server, etc.) that receives and processes the camera's image of the pseudo-random pattern of dots (e.g., 110), compares the processed image to a predetermined dot pattern map, and derives position or attitude information for the spherical object based on results of the comparison. For some embodiments, the predetermined dot pattern map is composed of the polar coordinates of each dot applied to the surface of the spherical object 102. In this regard, as described in more detail below, the digital processor unit 106 may execute suitable software instructions that implement an algorithm/method for deriving a Direction Cosine Matrix (DCM) that describes the three-dimensional rotation between the digital camera 104 and the moving spherical object 102.

Figure 2:
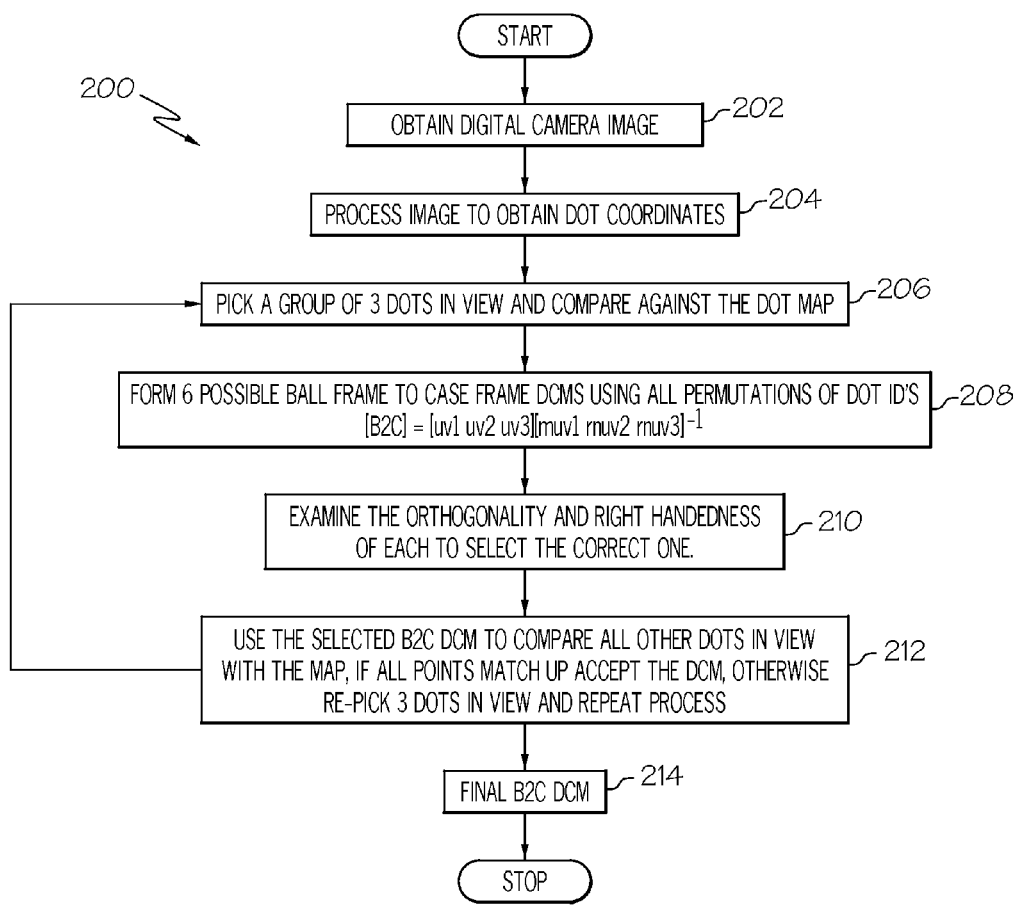
FIG. 2 is a flowchart depicting a method for determining the angular position of an object, which can be used to implement one or more example embodiments of the present invention.

FIG. 2 is a flowchart depicting a method 200 for determining the angular position of an object, which can be used to implement one or more example embodiments of the present invention. Essentially, method 200 may represent an algorithm that can be implemented as software instructions by digital processor unit 106 to process the image of dots viewed by digital camera 104, compare the positions of the viewed dots with a predetermined dot pattern map, and derive from that comparison the position or attitude of the spherical object with respect to the position or attitude of the digital camera's case. Notably, it may be assumed that the steps of method 200 may be re-performed such that the resulting position/attitude determination process is continuous, and changes in the position or attitude of a spherical (or non-spherical) object may be continuously tracked. For the sake of completeness, an Appendix including suitable software instructions for a digital processor to execute such an algorithm is provided at the end of the present application.

Referring now to FIGS. 1 and 2, for one or more example embodiments, it is preferable to use two coordinate frames to implement the algorithm/method 200 shown in FIG. 2: a coordinate frame associated with the camera's case; and a coordinate frame associated with the spherical (or non-spherical) object. As illustrated by the example embodiments depicted in FIG. 1, the camera case's coordinate frame is fixed with respect to the digital camera 104 and includes an X axis and Y axis in the plane of the field of view (FOV), and a Z axis that is normal to the FOV and extends to the nominal center of the spherical object (as indicated by numeral 112). For ease of understanding, it may be assumed that the observation direction of digital camera 104 is nominally aligned with the center of the spherical object 102, and the origin of the camera case's coordinate frame is selected to be the center of the FOV. Also, it may be assumed that the spherical object's coordinate frame is fixed with respect to the object and may be considered similar to an earth-centered, earth-fixed coordinate frame, with its Z axis going from the center of the object through the "North" pole, and its X and Y axes lying in the plane of the "Equator" with the X axis extending through the "zero longitude" line. The definition of the poles and the "Equator" of the spherical object 102 are formed by the two halves of the object, the "Equator" is formed by the join line of the two halves, and the "North" pole is located in the upper half.

For illustrative purposes and ease of understanding, the transformation of coordinate frames from that of the object 102 to that of the case of the digital camera 104 is hereinafter referred to as a Ball-to-Case (B2C) transformation (e.g., assuming, for some example embodiments, that the object is substantially ball-shaped). The B2C transformation can be decomposed into three rotations representing roll, pitch and yaw. As such, system 100 and method 200 may be used to implement an angular readout system and method that can derive a B2C transformation based on the digital camera's observations of the locations of dots on the surface of the spherical (or non-spherical) object involved, and transform those observations to the coordinate reference frame associated with the digital camera's case.

Referring to FIG. 2, the exemplary method 200 shown begins with digital processor unit 106 obtaining the image 110 observed by digital camera 104 (step 202). For example, but not intended to limit the scope of coverage of the exemplary embodiments, the digitized image 110 may be provided to digital processor unit 106 in the form of a two-dimensional matrix of values (e.g., array of pixels) representing the intensity of light received at each pixel of digital camera 104 in its FOV. Preferably, the dots located on the surface of the object 102 (e.g., ball-shaped object in this illustrative example) are arranged to contrast strongly with the background. For example, if the background of the object is light-colored (e.g., white), the dots may be dark-colored (e.g., black), or vice versa. Thus, each dot on the surface may form a circle of nominally constant light intensity, and the background of the surface also may form a constant but significantly different light intensity than that of the dots.

Next, digital processor unit 106 processes the received image information (e.g., pixel array), in order to obtain the frame coordinates of the observed dots with respect to the X, Y axes of the frame of the digital camera's case 104 (step 204). For example, this image data may be processed by digital processor unit 106 in two stages. First, digital processor unit 106 may correlate a simulated dot profile with the entire image received, in order to derive the approximate locations of the dots in view. Second, digital processor unit 106 may more accurately determine the centroids of the approximated locations of the dots in view, in order to provide accurate coordinates for each dot. The coordinates for each dot are scaled in pixels from the reference corner of the pixel array, and then converted to a distance from the center of the FOV using a previously calibrated pixel size. Thus, as a result of performing step 204, digital processor unit 106 can obtain accurate coordinates of the centroids of the dots in view, in terms of the X and Y axes of the coordinate frame of the digital camera's case 104.

Next, digital processor unit 106 may select (arbitrarily) a group of dots in the processed view of the received image information, and compare that selected group against a predetermined map or pattern of dots (step 206). The predetermined dot map may be stored in local memory 107 by digital processor unit 106. For example, digital processor unit 106 may select three of the dots in view, and calculate great circle distances for the three sides of the triangle formed by linking the three dots. The digital processor unit 106 may then form the ratio of the minimum side length of the triangle to the maximum length, the ratio of the middle length to the maximum length, and search a stored map of dots for a group of three dots that best matches the side length ratios and maximum side length value formed from the three viewed dots. The match can be used to determine the identities of a group of three dots in the map that best fit the relative locations of the observed dots.

Specifically, for some example embodiments, the dot patterns of the stored map are predetermined or assumed to be known in advance, and may be composed of a data record for each dot of 2,482 dots deposited on the surface of a sphere (e.g., 2,482 dots are a baseline set that can be used for a 5-inch radius ball). The data record stored for each dot may include, for example (i.e., not intended as a limitation), a number that identifies that dot, two polar coordinates (e.g., analogous to latitude and longitude) for that dot on the surface of the sphere, and the numbers of the X (e.g., 60) closest dots. For example, the layout of the dots on the object may be designed so that the pattern of dots is unique over the entire surface of the object, and at least three dots are in view at all observation angles, assuming a one inch by one inch FOV.

More precisely, for at least one embodiment, an initial search of the dot map may be performed by digital processor unit 106 to process three of the dots in view of digital camera 104 using a well-known astronomical, stellar sensor algorithm typically used for locating groups of stars in a star catalog. If more than three dots are in view, the best three dots in that view may be selected based on their relative positioning. For example, the widest dispersion of dots may be selected to provide a best estimate of the rotation angles involved. The values of the side lengths of the triangle formed by the three selected dots may be used for searching through the stored dot map. Initially, at startup, no prior history of position (e.g., attitude) exists, so the dot search preferably includes all permutations of the dots in the map, in order to locate a match to the viewed, processed set of dots. As such, the exemplary process of including 60 closest dots in the dot map can reduce the number of search permutations considerably for digital processor unit 106, but the processing time used (e.g., 1 second) for this initial step is still relatively long. However, subsequently (after startup) the position (e.g., attitude) history data can be used to reduce the extent of the dot map searches performed.

Next, digital processor unit 106 may construct a B2C transformation matrix for the best three-dot match found in the map. For example, in this regard, digital processor unit 106 may calculate a position (e.g., attitude) DCM by forming the unit vectors from the center of the spherical object 102 to each dot in view, and also from the center of the spherical object to each of the pertinent dots in the map. The unit vectors for the dots in view may be expressed, for example, as (uv1, uv2, uv3), and the unit vectors for the dots in the map may be expressed, for example, as (muv1, muv2, muv3). Digital processor unit 106 may use the two sets of unit vectors to form a 3-by-3 matrix for the map and camera data, and then form the B2C transformation DCM by multiplying one set of the unit vectors by the inverse of the other. In this regard, the B2C transformation matrix DCM may be expressed as:

[B2C]=[uv1 uv2 uv3][muv1 muv2 muv3]$^{-1}$.

Note that the above-described 3-dot search does not provide the identity of each dot involved, so the digital processor unit 106 may construct a matrix for the camera image data with six different permutations of unit vectors (step 208). In other words, the first of the two matrices shown in the B2C transformation above may be formed in six different ways to construct six different B2C transformation matrices, but only one of these transformation matrices is deemed to be correct. The correct B2C transformation may be assumed to describe an orthogonal right-handed rotation, so the digital processor unit 106 may check these attributes for all of the six B2C matrices, in order to select the best result (step 210). As an additional check, the selected B2C transformation may be used to compare the locations of other dots in view with the dot locations predicted by the map (step 212). As such, if all of the other dots in the camera's view match up with corresponding dots in the map, the digital processor unit 106 may accept that B2C transformation as correct, and that B2C DCM may be used for an angular position readout (step 214).

Note that for some example embodiments, the accuracy of the B2C transformation may be improved by forming the B2C transformation using the unit vectors for all of the dots in view.

Returning to step 212, if all of the other dots in the camera's view do not match up with the corresponding dots in the map, the digital processor unit 106 may consider that B2C transformation as incorrect, and the flow returns to step 206. Then, digital processor unit 106 may reiterate the steps of method 200, by selecting three different dots from the processed in-view image data, and comparing them with the dots in the stored map, and so on.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

APPENDIX

```
!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!
!
!   DOTSONBALL8.F90
!
!   Places dots on a 5 in radius ball surface, randomly placed
within cells of constant size over the surface. Initially
!   the dot density is chosen to be 1 per.125 inch squared which
gives approximately ~2500 total dots.
!   Modified from DOTSONBALL7 to read real camera data centroid
files.
!
!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!
use dflib
use dflogm
implicit none
integer nclose
parameter (nclose = 60)
real*8
dotlat(3000),dotlon(3000),dlat,dlon,pi,rpole,angpole,lat0,lon0,ar
ea,ballrad,dist,mindist,deltalat,bcerr(3),erord(6)
real*8
deltalon,fov(3),bc(3),bctoll(3,3),lat1,lon1,fovsize,dotx(100),dot
y(100),radeg,bufin(nclose+3),distance(3000),dotxc(100)
real*8
side(3),ratio1,ratio2,maxside,dlat1,dlon1,dlos1,cratio1,cratio2,c
maxside,offx,offy,ranoff,dotyc(100),dt,time_old
real*8
rnge(100),minerr,error,output(51),minerror,bc2(3),bc3(3),matb(3,5
,6),matbi(5,3),los1,up1(3),up2(3),up3(3),bc1(3)
real*8
bctoll_true(3,3),vc1(3),vc2(3),vc3(3),vb1(3),vb2(3),vb3(3),btoces
t(3,3),mata(3,5),atterr(3,3),bct(3),rr,obslos
real*8
errx,erry,errz,bufail(29),p1p2(2),p1p2mag,dotp,dotpmin,aa(2),disp
,maxdisp,vp3(2),costheta,p3mag,det(6),mapsig
real*8
btoc(3,3,6),ident(3,3),er(6),nerrx,nerry,nerrz,ep1,ep2,ep3,gauss,
doterr(3),dotsig,maperr(3,3000),rngord(100)
real*8
ma(3,100),mb(3,100),mbi(100,3),minrng,rng,dotrad,mag,deltabtoc(3,
3),qbtoc(4),pserr,btocest_all(3,3),errx_all
real*8
erry_all,errz_all,vc23(3),vc31(3),vb23(3),vb31(3),vb32(3),vb21(3)
,vb13(3),vb12(3),vcm(3),vcn(3),vbm(3)
real*8
nerrx_all,nerry_all,nerrz_all,detb(6),err(6),dsignlat,dsignlon,ds
ignlos,tim,tim_prev,rate,dang,time,obslat,obslon
real*8
vbn(3),vcmn(3),vcn1(3),vbmn(3),vbn1(3),obslat_all,obslon_all,obsl
os_all,meanx,meany,sigx,sigy,xerr(100),yerr(100)
```

```
real*8
camtiltx,camtilty,camdist,degrad,mapx(100),mapy(100),dotrng,rngth
resh,orthogthresh,maxrange,newlat,newlon,newang(3000,3)
real*4 rannum
integer*4
i,j,k,ndot,ndlat,ndlon,ntest,ndotin,dotnum(100),mindotin,mindots,
ndotcopy,ii,closest(3000,nclose),jj,jp1,nsearch,kclose
integer*4
bufcat(nclose+1),point1,point2,point3,cp1,cp2,cp3,minp1,minp2,min
p3,minii,mink,mnkc,mxkc,pass,maxk,savek,minjp1,cp1_prev
integer*4
rangeorder(100),erorder(6),cp(3,6),jp1p2,jp1p3,jp2p1,jp2p3,jp3p1,
jp3p2,mnp1,mnp2,mnp3,mxp1,mxp2,mxp3,pid(100),id,saveid
integer*4
inogood,mclose,pid_prev(100),ndotin_prev,ij,npass(15),nmapin,ifai
l,maxfail,kpass
integer*2 ihr,imn,isc,i100thsc
integer istat,index
logical
found,filend,screen,flagpause,manual,done,randoffset,mapcalsim,no
good,reset,coldstart,incremental,realdata,pixelcal,unreliable
character*1 ans
character*200
centfile,text,startdir,fileout,dirpath(100),files,mapdotfile
common /file/ dirpath,files,index
data dang/0.035d0/            !delta ball to case angle between
iterations - radians
data dsignlat,dsignlon,dsignlos/1d0,1d0,1d0/    !sign of random
motion at fixed rate dang for lat, lon and los
data dotrad/0.025d0/           !dot radius in inches
data area/0.125d0/
!data ballrad/5d0/
data ballrad/5.0d0/
data mindist/0.1d0/
data fovsize/1d0/
!data ntest/10000/
data ntest/1000000/
data mindots/3/
data screen/.false./           !output to screen
data flagpause/.false./        !pause at each test point
data kclose/50/                !initial number of closest
points to process
data mclose/40/                !number of closest points to
process, for incremental search
data ranoff/1.6d-3/            !sigma of random ball offset
in inches
!data dotsig/2d-2/              !sigma of dot placement
error in inches
data dotsig/1d-1/              !sigma of dot placement error
in inches
!data mapsig/1d-4/              !residual map error after
cal, in inches at fov
data mapsig/1d-3/              !residual map error after
cal, in inches at fov
data camtiltx/-1d0/                         !camera tilt
about case X axis - degrees    LATEST VALUES FOR INITIAL 5DEG/SEC
DATA SET 2/23/07
```

```
data camtilty/-2d0/                        !camera tilt
about case Y axis - degrees
data camdist/2.0d0/                        !distance from
camera to ball - inches
!data camtiltx/0d0/                        !camera tilt
about case X axis - degrees
!data camtilty/0d0/                        !camera tilt
about case Y axis - degrees
!data camdist/0d0/                         !distance from
camera to ball - inches
data npass/0,0,1,5,11,21,36,57,85,121,166,231,297,375,466/
!data ifail,maxfail/0,10/                  !failed cycles before
reverting to full search, at 5deg/sec can be 13 cycles for 2 deg
swing, using 10
data ifail,maxfail/0,5/                    !failed cycles before
reverting to full search, at 5deg/sec can be 13 cycles for 2 deg
swing, using 5
data kpass/0/
data unreliable/.false./
pi = dacos(-1d0)
radeg = 180d0/pi
degrad = 1d0/radeg
screen = .false.
print*,'Output to screen? [n],y'
read(5,"(a)") ans
if (ans .eq. 'y' .or. ans .eq. 'Y') then
   screen = .true.
   print*,'Pause at each test? [n],y'
   read(5,"(a)") ans
   if (ans .eq. 'y' .or. ans .eq. 'Y') flagpause = .true.
endif
print*,'Enter test lat lon Manually, generate Random, or read
real centroid Data? [r],m,d'
read(5,"(a)") ans
if (ans .eq. 'm' .or. ans .eq. 'M') then
   manual = .true.
   realdata = .false.

open(unit=40,file='d:\arrow\anglereadout\dotsonball7\test\bigerr.
dat',status='old')
else
   manual = .false.
   if (ans .eq. 'd' .or. ans .eq. 'D') then
      realdata = .true.
      text = 'Select centroid data file'
      startdir = 'd:\arrow\anglereadout\camera\ball_data\'
      call getfilein(centfile,text,startdir)
      open(101,file=centfile,status='old')
   else
      realdata = .false.
   endif
endif
if (realdata) then
   randoffset = .false.
   mapcalsim = .false.
else
   print*,'Randomize ball offset [n],y'
```

```
      read(5,"(a)") ans
      if (ans .eq. 'y' .or. ans .eq. 'Y') then
         randoffset = .true.
      else
         randoffset = .false.
      endif
      print*,'Include simulated map calibration to random dot
placement error [n],y'
      read(5,"(a)") ans
      if (ans .eq. 'y' .or. ans .eq. 'Y') then
         mapcalsim = .true.
      else
         mapcalsim = .false.
      endif
      print*,'Change random number seed for dot placement and angle
selection? [n],y'
      read(5,"(a)") ans
      if (ans .eq. 'y' .or. ans .eq. 'Y') call random_seed()
endif
print*,'Incremental Search, Coldstart or Pixel cal? [i],c,p'
read(5,"(a)") ans
if (ans .eq. 'c' .or. ans .eq. 'C') then
   incremental = .false.
   pixelcal = .false.
elseif (ans .eq. 'p' .or. ans .eq. 'P') then
   incremental = .false.
   pixelcal = .true.
else
   incremental = .true.
   pixelcal = .false.
endif
print*,'Camera tilt model? y,[n]'
read(5,"(a)") ans
if (ans .eq. 'y' .or. ans .eq. 'Y') then
   print*,'Current model parameters:'
   write(6,"('X tilt (deg): ',f5.2,'   Y tilt (deg): ',f5.2,'
Distance to lens (in): ',f5.2)") camtiltx,camtilty,camdist
   print*,'Change? y,[n]'
   read(5,"(a)") ans
      if (ans .eq. 'y' .or. ans .eq. 'Y') then
         print*,'enter new X, Y tilts and distance:'
            read(5,*) camtiltx,camtilty,camdist
      endif
else
   camtiltx = 0d0
   camtilty = 0d0
   camdist = 0d0
endif
print*,'Read existing dot file or make new [e],n'
read(5,"(a)") ans
if (ans .eq. 'n' .or. ans .eq. 'N') then
!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!!!
!
! Layout Dot Pattern for map, dots will be assumed to be applied
to the ball with some error
!
```

```
!!!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!!!!!!
!
! pole circles
!
   rpole = dsqrt(area/pi)
   angpole = dasin(rpole/ballrad)
!
! delta lat
!
   dlat = dsqrt(area)/ballrad
   ndlat = nint((pi - 2d0*angpole)/dlat)
   dlat = (pi - 2d0*angpole)/ndlat
!
! north pole dot
!
   ndot = 1
   call random_number(rannum)
   lat0 = pi/2d0 - angpole
   dotlat(ndot) = angpole*rannum + lat0
   call random_number(rannum)
   dotlon(ndot) = 2d0*pi*rannum
!
! south pole dot
!
   ndot = 2
   call random_number(rannum)
   lat0 = -pi/2d0 + angpole
   dotlat(ndot) = -angpole*rannum + lat0
   call random_number(rannum)
   dotlon(ndot) = 2d0*pi*rannum
!
! all of the others
!
   do i=1,ndlat
      lat0 = pi/2d0 - angpole - (i-0.5d0)*dlat
      dlon = dlat/dcos(lat0)
      ndlon = nint(2d0*pi/dlon)
      dlon = 2d0*pi/ndlon
      do j=1,ndlon
         lon0 = (j-1)*dlon
         ndot = ndot + 1
1000     call random_number(rannum)
         dotlat(ndot) = lat0 + (rannum-0.5)*dlat
         call random_number(rannum)
         dotlon(ndot) = lon0 + rannum*dlon
! distance between this dot and all others
! dot in ball center frame
         call calcbc_new(bc,dotlat(ndot),dotlon(ndot),1d0)
         found = .false.
         k = 0
         do while (.not. found .and. k .lt. ndot-1)
            k = k + 1
! dot in ball center frame
            call calcbc_new(bc1,dotlat(k),dotlon(k),1d0)
! great circle distance between dots
            call gcd(bc,bc1,dist)
```

```
! redo this dot if closer than mindist to any other dot
            if (dist*ballrad .lt. mindist) found = .true.
         enddo
         if (found) goto 1000
      enddo
   enddo
! make a dot catalog, store closest 60 neighbors for each dot
   open
(unit=20,file='d:\arrow\anglereadout\dotsonball8\test\dotmap_new.
dat',status='unknown')
   call
calc_closest(dotlat,dotlon,ballrad,ndot,closest,nclose,fovsize)
   do i=1,ndot
      write(20,*) i,dotlat(i),dotlon(i),(closest(i,j),j=1,nclose)
   enddo
   close (20)
else
!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!
!
! read existing dot map file
!
!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!
!
open(unit=20,file='d:\arrow\anglereadout\dotsonball8\test\dotmap.
dat',status='old')

open(unit=20,file='d:\arrow\anglereadout\camera\ball_data\newdotm
ap\test\dotmap_new.dat',status='old')
   filend = .false.
   do while (.not. filend)
      filend = .true.
      read(20,*,end=2000,err=2000) bufin
      filend = .false.
      ndot = ndot + 1
      dotlat(ndot) = bufin(2)
      dotlon(ndot) = bufin(3)
      do j=1,nclose
         closest(ndot,j) = int4(bufin(j+3))
      enddo
2000  continue
   enddo
   close (20)
endif
write(6,*) ndot
!
! dot/map position errors
!
! simulate calibration of dot map to dots on ball
if (mapcalsim) then
   do i=1,ndot
      call bctofov_3axis(bctoll,dotlat(i),dotlon(i),0d0)
! dot positioning error, error in fov frame with zero rotation
about los
      doterr(1) = gauss(dotsig)
      doterr(2) = gauss(dotsig)
```

```
!       doterr(3) = 0d0
        doterr(3) = ballrad-dsqrt(ballrad**2-doterr(1)**2-
doterr(2)**2)
        call atxb(bcerr,bctoll,doterr,3,3,1)
        call calcbc_new(bc,dotlat(i),dotlon(i),ballrad)
        do j=1,3
           bct(j) = bc(j) + bcerr(j)
        enddo
! make bct a unit vector
        call vnorm(bct)
! new map values from simulated calibration
        dotlat(i) = dasin(bct(3))
        dotlon(i) = datan2(bct(2),bct(1))
! residual map error in fov frame
        doterr(1) = gauss(mapsig)/ballrad
        doterr(2) = gauss(mapsig)/ballrad
!        doterr(3) = 0d0
        doterr(3) = 1d0-dsqrt(1d0-doterr(1)**2-doterr(2)**2)
        call bctofov_3axis(bctoll,dotlat(i),dotlon(i),0d0)
        call atxb(maperr(1,i),bctoll,doterr,3,3,1)
     enddo
! recalculate closest points
     call
calc_closest(dotlat,dotlon,ballrad,ndot,closest,nclose,fovsize)
endif
!
! distance between dots
!
mindist = 1d10
do i=1,ndot
   call calcbc_new(bc,dotlat(i),dotlon(i),1d0)
   do j=1,ndot
      call calcbc_new(bc1,dotlat(j),dotlon(j),1d0)
      call gcd(bc,bc1,dist)
      if (i .ne. j .and. dist*ballrad .lt. mindist) mindist =
dist*ballrad
   enddo
enddo
write(6,*) mindist
!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!!!!
!
! choose dots visible in random placement of field of view over
ball surface
!
543 text = 'Select output file'
startdir = ''
call getfileout(fileout,text,startdir)
open(30,file=fileout,status='new',err=321)
goto 432
321 write(6,"(a)") trim(fileout)
print*,'File already exists, overwrite it? y,[n]'
read(5,"(a)") ans
if (ans .eq. 'y' .or. ans .eq. 'Y') then
   open(30,file=fileout,status='unknown')
else
   goto 543
```

```
      endif
!open(unit=30,file='d:\arrow\anglereadout\dotsonball8\test\result
s.dat',status='unknown')
!open(unit=20,file='d:\arrow\anglereadout\dotsonball7\test\sides1
.dat',status='unknown')
 432  mindotin = 1000000
      i=0
      ij=-301
      mxkc = -1
      done = .false.
      call gettim(ihr,imn,isc,i100thsc)
      tim_prev = ihr + imn/60d0 + isc/3600d0 + i100thsc/360000d0
!
      mapdotfile = trim(dirpath(index))//'mapvsdots.dat'
      open (unit=100,file=mapdotfile,status='unknown')
!
      do while (i .lt. ntest .and. .not. done .and. ij .le. 300)
! center lat, lon for fov
         if (manual) then
            done = .true.
            read(40,*,end=1234) bufail
            done = .false.
            lat1 = bufail(14)
            lon1 = bufail(15)
            los1 = bufail(16)
            i = bufail(1)
            coldstart = .true.
         elseif (realdata) then
            if ((pixelcal .and. i .eq. 0) .or. .not. pixelcal) then
               done = .true.
               read(101,*,end=1234,err=1234) time
               read(101,*,end=1234,err=1234) ndotin
               do j=1,ndotin
                  read(101,*,end=1234,err=1234) dotx(j),doty(j)
!
!    camera tilt compensation
!
                  dotx(j) = dotx(j)/dcos(camtilty*degrad) +
(camdist + 0.025d0) * dtan(camtilty*degrad)
                  doty(j) = doty(j)/dcos(camtiltx*degrad) +
(camdist + 0.025d0) * dtan(camtiltx*degrad)
                  dotxc(j) = dotx(j)
                  dotyc(j) = doty(j)
               enddo
               done = .false.
               i = i + 1
               dt = time - time_old
               time_old = time
               if (i.eq. 1) then
                  coldstart = .true.
               else
                  if (incremental .and. dt .lt. 1d0 .and. (.not. nogood
.or. (ifail .lt. maxfail .and. .not. unreliable))) then
                     coldstart = .false.
                  else
                     coldstart = .true.
                  endif
```

```fortran
            endif
        endif
        if (pixelcal) then
            ij = ij + 1
            do j=1,ndotin
                dotx(j) = dotxc(j) * (1d0 + dble(ij)/1000d0)
                doty(j) = dotyc(j) * (1d0 + dble(ij)/1000d0)
            enddo
        endif
        if (ndotin .lt. mindots) then
            write(6,*) ndotin,i
            call beepqq(1000,500)
            pause
        endif
        if (ndotin .lt. mindotin) mindotin = ndotin
    else
        i = i + 1
        if (i.eq. 1) then
            call random_number(rannum)
            lat1 = (rannum-0.5d0)*pi
            call random_number(rannum)
            lon1 = rannum*2d0*pi
            call random_number(rannum)
            los1 = rannum*2d0*pi
            coldstart = .true.
        else
            call random_number(rannum)
            if (rannum .gt. 0.95d0) dsignlat = -1d0*dsignlat
            call random_number(rannum)
            if (rannum .gt. 0.95d0) dsignlon = -1d0*dsignlon
            call random_number(rannum)
            if (rannum .gt. 0.95d0) dsignlos = -1d0*dsignlos
            dlat1 = dang*dsignlat
            dlon1 = dang*dsignlon
            dlos1 = dang*dsignlos
            lat1 = lat1 + dlat1
            lon1 = lon1 + dlon1
            los1 = los1 + dlos1
            if (lat1 .gt. pi/2d0) then
                lat1 = pi - lat1
                lon1 = lon1 + pi
                dsignlat = -1d0*dsignlat
                dsignlon = -1d0*dsignlon
            elseif (lat1 .lt. -pi/2d0) then
                lat1 = -pi - lat1
                lon1 = lon1 + pi
                dsignlat = -1d0*dsignlat
                dsignlon = -1d0*dsignlon
            endif
            if (lon1 .gt. 2d0*pi) lon1 = lon1 - 2d0*pi
            if (lon1 .lt. 0d0) lon1 = lon1 + 2d0*pi
            if (los1 .gt. 2d0*pi) los1 = los1 - 2d0*pi
            if (los1 .lt. 0d0) los1 = los1 + 2d0*pi
            if (incremental) then
                coldstart = .false.
            else
                coldstart = .true.
```

```
              endif
          endif
       endif
       if (.not. realdata) then
! ball center to local level frame transformation
          call bctofov_3axis(bctoll_true,lat1,lon1,los1)
! check dots to see which are in the fov
          ndotin = 0
          do j=1,ndot
! dot in ball center frame
             call calcbc_new(bc,dotlat(j),dotlon(j),ballrad)
! dot coords in fov frame
             call dmult(bctoll_true,bc,fov,3,3,1,3,3,3,1,3,1)
! test if inside fov
             if (dabs(fov(1)) .lt. fovsize/2d0 .and. dabs(fov(2))
.lt. fovsize/2d0 .and. fov(3) .lt. 0d0) then
! dot is inside fov
                ndotin = ndotin + 1
                dotx(ndotin) = fov(1)
                doty(ndotin) = fov(2)
                dotnum(ndotin) = j
             endif
          enddo
          if (ndotin .lt. mindotin) mindotin = ndotin
          if (ndotin .lt. mindots) then
             write(6,*) ndotin,i
             call beepqq(1000,500)
             pause
          endif
          if (mod(i,100) .eq. 0)then
             write(6,*) i,mindotin
             mindotin = 1000000
             call gettim(ihr,imn,isc,i100thsc)
             tim = ihr + imn/60d0 + isc/3600d0 + i100thsc/360000d0
             rate = 100d0/(tim-tim_prev)/3600d0
             tim_prev = tim
             write(6,"('Execution rate (Hz): ',f20.10)") rate
          endif
! simulate the random ball offset in the cavity
          if (randoffset) then
             offx = gauss(ranoff)
             offy = gauss(ranoff)
          else
             offx = 0d0
             offy = 0d0
          endif
          do j=1,ndotin
             dotx(j) = dotx(j)+offx
             doty(j) = doty(j)+offy
          enddo
! simulate observation of each dot using star tracker
          do j=1,ndotin
             call sensorsim(dotx(j),doty(j))
          enddo
       endif
!!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!
```

```
!
! from dotsonplane 05-02-06
!
! choose 3 points in fov to use for point matching
! initially select point1 to max distance from the fov origin,
second point is farthest from point1,
! third with max orthogonal displacement from p1-p2 vector
      nogood = .false.
      reset = .true.        !changed this back to true 7-19-06
      pass = 1
!7-18-06 tom richhii points out this cannot work properly
inogood = 1
2212 continue
!     inogood = 0
      if (nogood) then
         pass = pass + 1
         if (reset) then
            point1 = 1
            point2 = 2
            point3 = 2
            reset = .false.
         endif
!        write(6,"('Number of points in view: ',i4)") ndotin
!        write(6,"('Enter points to use for solution: ')")
!        read(5,*) point1,point2,point3
         point3 = point3 + 1
         if (point3 .gt. ndotin) then
            point2 = point2 + 1
            point3 = point2 + 1
         endif
         if (point2 .ge. ndotin) then
            point1 = point1 + 1
            point2 = point1 + 1
            point3 = point2 + 1
         endif
         if (point1 .ge. ndotin-1) then
            goto 2222
         endif
      else
!
! end of dotsonplane stuff 05-02-06
!
! calc range of all points from fov origin
      do j=1,ndotin
         rnge(j) = dsqrt(dotx(j)**2+doty(j)**2)
      enddo
! sort ranges in ascending order
      call order(rnge,rngord,rangeorder,ndotin,100)
! select point1 to be max distance from fov origin
      point1 = rangeorder(ndotin)
! select point1 to be min distance from fov origin
!        point1 = rangeorder(1)
! select other points to be closest to origin
!        point2 = rangeorder(2)
!        point3 = rangeorder(3)
! calc range of all points from point1
      do j=1,ndotin
```

```
            rnge(j) = dsqrt((dotx(point1)-dotx(j))**2+(doty(point1)-
doty(j))**2)
        enddo
! sort ranges in ascending order
        call order(rnge,rngord,rangeorder,ndotin,100)
! choose other two points
        if (ndotin .eq. 3) then            !if only three points no
choice
           if (point1 .eq. 1) then
              point2 = 2
              point3 = 3
           elseif (point1 .eq. 2) then
              point2 = 1
              point3 = 3
           else                !point1 = 3
              point2 = 1
              point3 = 2
           endif
        else
! more than 3 points, choose best other 2
           point2 = rangeorder(ndotin)     !choose point2 with
largest range to point1
! calc point1 to point2 vector
           p1p2mag = dsqrt((dotx(point2)-dotx(point1))**2 +
(doty(point2)-doty(point1))**2)
           p1p2(1) = (dotx(point2)-dotx(point1))/p1p2mag
           p1p2(2) = (doty(point2)-doty(point1))/p1p2mag
! mid point on p1p2 vector
           aa(1) = (dotx(point1)+dotx(point2))/2d0
           aa(2) = (doty(point1)+doty(point2))/2d0
! calculate dot products for all points and find maximum
displacement orthogonal to p1p2
           maxdisp = -1d10
           do j=2,ndotin-1
              jj = rangeorder(j)
! point3 vector wrt aa
              vp3(1) = dotx(jj) - aa(1)
              vp3(2) = doty(jj) - aa(2)
              p3mag = dsqrt(vp3(1)**2 + vp3(2)**2)
              costheta =
dabs((vp3(1)*p1p2(1)+vp3(2)*p1p2(2))/p3mag)
              if (costheta .ge. 1d0) then
                 disp = 0d0
              else
                 disp = p3mag*dsin(dacos(costheta))
              endif
              if (disp .gt. maxdisp) then
                 maxdisp = disp
                 point3 = jj
              endif
           enddo
        endif
     endif
! calculate great circle distance between dots
! unit vectors from ball center to each point on screen, in fov
frame
! p1
```

```
      up1(1) = dotx(point1)/ballrad
      up1(2) = doty(point1)/ballrad
      up1(3) = -dsqrt(1d0-up1(1)**2-up1(2)**2)
! p2
      up2(1) = dotx(point2)/ballrad
      up2(2) = doty(point2)/ballrad
      up2(3) = -dsqrt(1d0-up2(1)**2-up2(2)**2)
! p3
      up3(1) = dotx(point3)/ballrad
      up3(2) = doty(point3)/ballrad
      up3(3) = -dsqrt(1d0-up3(1)**2-up3(2)**2)
! calc gcd between p1 and p2
      call gcd(up1,up2,side(1))
! calc gcd between p1 and p3
      call gcd(up1,up3,side(2))
! calc gcd between p2 and p3
      call gcd(up2,up3,side(3))
! calculate ratios of length of triangle sides
      call sideratios(side,ratio1,ratio2,maxside)
! search dot list for observed ratios
      ep1 = 0d0
      ep2 = 0d0
      ep3 = 0d0
! set loop variable for test point 1
!     jp1 = 0                           !7/13/06 tom ricchi
pointed out that this cannot work, must move inside the 2200 goto
! loop through all dots
!     minerror = 1d10
!
2200 continue
! set loop variable for test point 1
      jp1 = 0
! loop through all dots
      minerror = 1d10
!
      if (coldstart) then
         nsearch = ndot
            if (ndotin .eq. 3) then          !3-1-07
               unreliable = .true.
            else
               unreliable = .false.
            endif
      else
         nsearch = nclose
      endif
!
!    do while (j .lt. ndot)
      do while (jp1 .lt. nsearch)
         jp1 = jp1 + 1
! calculate unit vector from ball center to test point 1
         if (coldstart) then
            j = jp1
         else
!jsw 7-18-06 tom ricchii points out this cannot work properly
if (inogood .le. ndotin_prev) then
!           if (inogood .ne. 0) then
!              j = closest(pid_prev(inogood),jp1)
```

```
!          else
              j = closest(cp1_prev,jp1)
!          endif
       endif
       call calcbc_new(bc1,dotlat(j),dotlon(j),1d0)
! add residual map error if selected
       if (mapcalsim) then
          do jj=1,3
             bc1(jj) = bc1(jj) + maperr(jj,j)
          enddo
          call vnorm(bc1)
       endif
! set loop variable for test point 2
       k = 0
! loop through combinations of closest points
       do while (k .lt. kclose-1)
          k = k + 1
! calculate unit vector from ball center to test point 2
          call
calcbc_new(bc2,dotlat(closest(j,k)),dotlon(closest(j,k)),1d0)
! add residual map error if selected
          if (mapcalsim) then
             do jj=1,3
                bc2(jj) = bc2(jj) + maperr(jj,closest(j,k))
             enddo
             call vnorm(bc2)
          endif
! calc gcd between p1 and p2
          call gcd(bc1,bc2,side(1))
! set loop variable for test point 3
          ii = k
          do while (ii .lt. kclose)
             ii = ii + 1
! calculate unit vector from ball center to test point 3
             call
calcbc_new(bc3,dotlat(closest(j,ii)),dotlon(closest(j,ii)),1d0)
! add residual map error if selected
             if (mapcalsim) then
                do jj=1,3
                   bc3(jj) = bc3(jj) + maperr(jj,closest(j,ii))
                enddo
                call vnorm(bc3)
             endif
! calc gcd between p1 and p3
             call gcd(bc1,bc3,side(2))
! calc gcd between p2 and p3
             call gcd(bc2,bc3,side(3))
!             do jj=1,3
!                write(20,*) side(jj)
!             enddo
! calculate side ratios
             call sideratios(side,cratio1,cratio2,cmaxside)
! form error
             error = (cratio1-ratio1)**2 + (cratio2-ratio2)**2 +
((cmaxside/maxside) - 1d0)**2
!             error = (cratio1-ratio1)**2 + (cratio2-ratio2)**2
! test to see if this is smallest error so far
```

```
               if (error .lt. minerror) then
                  minerror = error
                  minp1 = j
                  minp2 = closest(j,k)
                  minp3 = closest(j,ii)
                  minii = ii
                  mink = k
                  minjp1 = jp1
               endif
            enddo
         enddo
      enddo
!     write(6,*) jp1p2,jp1p3,jp2p1,jp2p3,jp3p1,jp3p2
!     write(6,*) mink,minii
!     write(6,*) mnkc,mxkc
!     write(6,*) ep1,ep2,ep3
!     write(6,*) minerror
!     write(6,"('')")
! save match data
      cp1 = minp1
      cp2 = minp2
      cp3 = minp3
      error = dsqrt(minerror)
! derive ball attitude using unit vector approach
! unit vectors to dots on screen from ball center, in fov frame
! point 1
      vc1(1) = dotx(point1)/ballrad
      vc1(2) = doty(point1)/ballrad
!     vc1(3) = dsqrt(1d0 - vc1(1)**2-vc1(2)**2)
      vc1(3) = -dsqrt(1d0 - vc1(1)**2-vc1(2)**2)
! point 2
      vc2(1) = dotx(point2)/ballrad
      vc2(2) = doty(point2)/ballrad
!     vc2(3) = dsqrt(1d0 - vc2(1)**2-vc2(2)**2)
      vc2(3) = -dsqrt(1d0 - vc2(1)**2-vc2(2)**2)
! point 3
      vc3(1) = dotx(point3)/ballrad
      vc3(2) = doty(point3)/ballrad
!     vc3(3) = dsqrt(1d0 - vc3(1)**2-vc3(2)**2)
      vc3(3) = -dsqrt(1d0 - vc3(1)**2-vc3(2)**2)
! unit vectors to dots identified on screen using dotmap, from
ball center in ball frame
! cpoint 1
      call calcbc_new(vb1,dotlat(cp1),dotlon(cp1),1d0)
! cpoint 2
      call calcbc_new(vb2,dotlat(cp2),dotlon(cp2),1d0)
! cpoint 3
      call calcbc_new(vb3,dotlat(cp3),dotlon(cp3),1d0)
! extra cross product unit vectors
      call acrosb(vc23,vc2,vc3)
      call acrosb(vc31,vc3,vc1)
!
      call acrosb(vb23,vb2,vb3)
      call acrosb(vb31,vb3,vb1)
!
      call acrosb(vb32,vb3,vb2)
      call acrosb(vb21,vb2,vb1)
```

```
!
   call acrosb(vb13,vb1,vb3)
!   call acrosb(vb32,vb3,vb2)
!
   call acrosb(vb12,vb1,vb2)
!   call acrosb(vb23,vb2,vb3)
!
!   call acrosb(vb31,vb3,vb1)
!   call acrosb(vb12,vb1,vb2)
!
!   call acrosb(vb21,vb2,vb1)
!   call acrosb(vb13,vb1,vb3)
! form dcms six permutations, including extra cross product
vectors
   do j=1,3
      mata(j,1) = vc1(j)
      mata(j,2) = vc2(j)
      mata(j,3) = vc3(j)
         mata(j,4) = vc23(j)
         mata(j,5) = vc31(j)
!
      matb(j,1,1) = vb1(j)
      matb(j,2,1) = vb2(j)
      matb(j,3,1) = vb3(j)
      matb(j,4,1) = vb23(j)
      matb(j,5,1) = vb31(j)
!
      matb(j,1,2) = vb1(j)
      matb(j,2,2) = vb3(j)
      matb(j,3,2) = vb2(j)
      matb(j,4,2) = vb32(j)
      matb(j,5,2) = vb21(j)
!
      matb(j,1,3) = vb2(j)
      matb(j,2,3) = vb1(j)
      matb(j,3,3) = vb3(j)
      matb(j,4,3) = vb13(j)
      matb(j,5,3) = vb32(j)
!
      matb(j,1,4) = vb3(j)
      matb(j,2,4) = vb1(j)
      matb(j,3,4) = vb2(j)
      matb(j,4,4) = vb12(j)
      matb(j,5,4) = vb23(j)
!
      matb(j,1,5) = vb2(j)
      matb(j,2,5) = vb3(j)
      matb(j,3,5) = vb1(j)
      matb(j,4,5) = vb31(j)
      matb(j,5,5) = vb12(j)
!
      matb(j,1,6) = vb3(j)
      matb(j,2,6) = vb2(j)
      matb(j,3,6) = vb1(j)
      matb(j,4,6) = vb21(j)
      matb(j,5,6) = vb13(j)
   enddo
```

```
! point ids
   cp(1,1) = minp1
   cp(2,1) = minp2
   cp(3,1) = minp3
!
   cp(1,2) = minp1
   cp(2,2) = minp3
   cp(3,2) = minp2
!
   cp(1,3) = minp2
   cp(2,3) = minp1
   cp(3,3) = minp3
!
   cp(1,4) = minp3
   cp(2,4) = minp1
   cp(3,4) = minp2
!
   cp(1,5) = minp2
   cp(2,5) = minp3
   cp(3,5) = minp1
!
   cp(1,6) = minp3
   cp(2,6) = minp2
   cp(3,6) = minp1
! form 6 ball to case dcms, calc a*at, det of dcm, and errors in a*at
   do j=1,6
!        call dinvrt(matb(1,1,j),matbi,3,3,wv1,wv2)
!        call dmult(mata,matbi,btoc(1,1,j),3,3,3,3,3,3,3,3,3)
      call pseudoinv(matb(1,1,j),matbi,3,5,5,pserr)
      call dmult(mata,matbi,btoc(1,1,j),3,5,3,3,5,5,3,3,3)
      call axbt(ident,btoc(1,1,j),btoc(1,1,j),3,3,3)
      call det3(btoc(1,1,j),det(j))
      er(j) = 0d0
      do ii=1,3
         do k=1,3
            if (ii .eq. k) then
               er(j) = er(j) + (ident(ii,k)-1d0)**2
            else
               er(j) = er(j) + ident(ii,k)**2
            endif
         enddo
      enddo
      call det3(matb(1,1,j),detb(j))
      call dmult(matb(1,1,j),matbi,ident,3,3,3,3,3,3,3,3,3)
      err(j) = 0d0
      do ii=1,3
         do k=1,3
            if (ii .eq. k) then
               err(j) = err(j) + (ident(ii,k)-1d0)**2
            else
               err(j) = err(j) + ident(ii,k)**2
            endif
         enddo
      enddo
   enddo
```

```
! choose the most orthogonal, ie the one which best satifies
a*at=i and has det = 1
! sort er in ascending order
   call order(er,erord,erorder,6,6)
! which one gives min error
   found=.false.
   ii=0
   do while (.not. found .and. ii .lt. 6)
      ii=ii+1
      if (det(erorder(ii)) .gt. 0d0) then
         found = .true.
         minerr = er(erorder(ii))
         do j=1,3
            do k=1,3
               btocest(j,k) = btoc(j,k,erorder(ii))
            enddo
         enddo
         cp1 = cp(1,erorder(ii))
         cp2 = cp(2,erorder(ii))
         cp3 = cp(3,erorder(ii))
!           write(6,*) detb(erorder(ii)),err(erorder(ii))
      endif
   enddo
   if (.not. found) then
      print*,'Error!!!'
      stop
   endif
!
! don't check all points in view if trying to roughly cal the
pixels
!
   if (pixelcal) goto 2222
!
! from dotsonplane 05-02-06
!
! identify all points in view by comparing against closest map
points
   nogood = .false.
   maxk = -1000
   maxrange = -1d0
   do j=1,ndotin
      minrng = 1d10
      pid(j) = -1000
      saveid = -1000
      savek = -1000
      if (j.eq. point1) then
         call calcbc_new(vb1,dotlat(cp1),dotlon(cp1),ballrad)
         call axb(vc1,btocest,vb1,3,3,1)
         minrng = dsqrt((dotx(j)-vc1(1))**2 + (doty(j)-
vc1(2))**2)
         saveid = cp1
         savek = 0
      else
         do k=1,nclose
            id = closest(cp1,k)
            call calcbc_new(vb1,dotlat(id),dotlon(id),ballrad)
            call axb(vc1,btocest,vb1,3,3,1)
```

```
                    rng = dsqrt((dotx(j)-vc1(1))**2 + (doty(j)-
vc1(2))**2)
                if (rng .lt. minrng) then
                   minrng = rng
                   saveid = id
                   savek = k
                endif
             enddo
          endif
          if (savek .gt. maxk) maxk = savek
!          if (minrng .lt. 0d0*dotrad) then
!          if (minrng .lt. 0.4d0) then
          dotrng = dsqrt(dotx(j)**2 + doty(j)**2)
!          rngthresh = dotrng/4d0
!          rngthresh = max(rngthresh,3d0*dotrad)
!2-22-07       rngthresh = 3d0*dotrad
!3-1-07        rngthresh = 2d0*dotrad
!3-19-07       rngthresh = 1.6d0*dotrad
          rngthresh = dotrad
!          orthogthresh = 0.008d0              !3-19-07
           orthogthresh = 0.004d0              !3-19-07
!3-19-07
          if (minrng .gt. maxrange) maxrange = minrng
!3-19-07
       if (screen) write(6,"(i4,3f20.10)")
j,minrng,rngthresh,dotrng
!          if (minrng .lt. 3d0*dotrad) then
!3-19-07       if (minrng .lt. rngthresh) then
       if (minrng .lt. rngthresh .and. minerr .lt. orthogthresh)
then
             pid(j) = saveid
          else
             nogood = .true.
          endif
!         write(6,*) j,minrng,dotrad,pid(j)
       enddo
       if (nogood) then
!          write(6,*) (pid(j),j=1,ndotin)
!          write(6,*) dotnum(point1),dotnum(point2),dotnum(point3)
!          pause
!          if (point1 .eq. ndotin-2 .and. point2 .eq. ndotin-1 .and.
point3 .eq. ndotin) then
          if (pass .ge. npass(ndotin)) then
             ifail = ifail + 1
             goto 2222            ! tried all options can't solve it
so give up and move on
          else
             if (screen) then
                write(6,*) pass
                write(6,*) point1,point2,point3
                write(6,*) cp1,cp2,cp3
!               if (flagpause) pause
             endif
!7-19-06 if tried all of previous fov points try different group
of in view points   if (.not. coldstart) then
!             if (.not. coldstart .and. pass .eq. 1) then
!                inogood = inogood + 1
```

```
!              if (inogood .gt. ndotin_prev) then
!                 goto 2212
!              else
!                 goto 2200
!              endif
!           else
!              goto 2212
!           endif
        endif
     else
        ifail = 0
          if (ndotin .gt. 3) unreliable = .false.
!3-23-07
!       do j=1,ndotin
!          call
calcbc_new(vb1,dotlat(pid(j)),dotlon(pid(j)),ballrad)
!          call axb(vc1,btocest,vb1,3,3,1)
!          vc1(1) = dotx(j)           !set the map point equal to
the measured dot location if range error is to large
!          vc1(2) = doty(j)
!          call atxb(vb1,btocest,vc1,3,3,1)    !transform vector
back to ball frame
!          call calcang_new(vb1,newlat,newlon,ballrad)
!          newang(pid(j),1) = newang(pid(j),1) + newlat
!          if (newlon .lt. 0d0) newlon = newlon + 2d0*pi
!          newang(pid(j),2) = newang(pid(j),2) + newlon
!          newang(pid(j),3) = newang(pid(j),3) + 1d0
!       enddo
!3-23-07
     endif
! reestimate btoc rotation using all points in view
     do j=1,ndotin
! unit vectors to measured dots on screen from ball center, in
fov frame
        ma(1,j) = dotx(j)/ballrad
        ma(2,j) = doty(j)/ballrad
        ma(3,j) = -dsqrt(1d0 - ma(1,j)**2-ma(2,j)**2)
! unit vectors to dots identified on screen using dotmap, from
ball center in ball frame
        call calcbc_new(vb1,dotlat(pid(j)),dotlon(pid(j)),1d0)
        mb(1,j) = vb1(1)
        mb(2,j) = vb1(2)
        mb(3,j) = vb1(3)
        pid_prev(j) = pid(j)
     enddo
     cp1_prev = cp1
     ndotin_prev = ndotin
! add cross product vectors
!    do k=1,3
!       vcm(k) = ma(k,ndotin-1)
!       vcn(k) = ma(k,ndotin)
!       vc1(k) = ma(k,1)
!       vbm(k) = mb(k,ndotin-1)
!       vbn(k) = mb(k,ndotin)
!       vb1(k) = mb(k,1)
!    enddo
!    call acrosb(vcmn,vcm,vcn)
```

```
!     call acrosb(vcn1,vcn,vc1)
!     call acrosb(vbmn,vbm,vbn)
!     call acrosb(vbn1,vbn,vb1)
!     do k=1,3
!        ma(k,ndotin+1) = vcmn(k)
!         ma(k,ndotin+2) = vcn1(k)
!         mb(k,ndotin+1) = vbmn(k)
!         mb(k,ndotin+2) = vbn1(k)
!     enddo
!
      call pseudoinv(mb,mbi,3,100,ndotin,pserr)
      call dmult(ma,mbi,btocest_all,3,ndotin,3,3,100,100,3,3,3)
!      call pseudoinv(mb,mbi,3,100,ndotin+2,pserr)
!      call dmult(ma,mbi,btocest_all,3,ndotin+2,3,3,100,100,3,3,3)
!
! orthogonalize btocest_all by converting to quaternion and back
!
      call dcmtoq(btocest_all,qbtoc,istat)
      call qnorm(qbtoc)
      call qtodcm(qbtoc,btocest_all)         !Joe Protola pointed
out that pseudo inverse is backwards, fixed it
!
! calculate residual distances from measured to map points for
all in view
!
      meanx = 0d0
      meany = 0d0
      sigx = 0d0
      sigy = 0d0
      do j=1,ndotin
         call calcbc_new(vb1,dotlat(pid(j)),dotlon(pid(j)),ballrad)
         call axb(vc1,btocest_all,vb1,3,3,1)
         xerr(j) = dotx(j)-vc1(1)
          yerr(j) = doty(j)-vc1(2)
          meanx = meanx + xerr(j)/ndotin
          meany = meany + yerr(j)/ndotin
      enddo
      do j=1,ndotin
         sigx = sigx + ((xerr(j) - meanx)**2)/ndotin
         sigy = sigy + ((yerr(j) - meany)**2)/ndotin
      enddo
      sigx = dsqrt(sigx)
      sigy = dsqrt(sigy)
!
2222 continue
!
! check which map dots are in view
!
      nmapin = 0
      do j=1,ndot
! dot in ball center frame
         call calcbc_new(bc,dotlat(j),dotlon(j),ballrad)
! dot coords in fov frame
!         if (nogood) then
            call dmult(btocest,bc,fov,3,3,1,3,3,3,1,3,1)
!         else
!             call dmult(btocest_all,bc,fov,3,3,1,3,3,3,1,3,1)
```

```
!          endif
! test if inside fov
!          if (dabs(fov(1)) .lt. fovsize/2d0 .and. dabs(fov(2)) .lt.
fovsize/2d0 .and. fov(3) .lt. 0d0) then
           if (dabs(fov(1)) .lt. 0.8d0 .and. dabs(fov(2)) .lt. 0.8d0
.and. fov(3) .lt. 0d0) then
! dot is inside fov
           nmapin = nmapin + 1
           mapx(nmapin) = fov(1)
           mapy(nmapin) = fov(2)
         endif
      enddo
!
!  orthogonalize btocest by converting to quaternion and back
!
      call dcmtoq(btocest,qbtoc,istat)
      call qnorm(qbtoc)
      call qtodcm(qbtoc,btocest)
!
! end of dotsonplane stuff 05-02-06
!
      if (.not. realdata) then
! attitude errors in fov (case) frame for btocest
         call axbt(atterr,btocest,bctoll_true,3,3,3)
! orthogonal errors
         errx = (atterr(2,3)-atterr(3,2))/2d0
         erry = (atterr(3,1)-atterr(1,3))/2d0
         errz = (atterr(1,2)-atterr(2,1))/2d0
! non orthogonal errors
         nerrx = (atterr(2,3)+atterr(3,2))/2d0
         nerry = (atterr(3,1)+atterr(1,3))/2d0
         nerrz = (atterr(1,2)+atterr(2,1))/2d0
! attitude errors in fov (case) frame for btocest_all
         call axbt(atterr,btocest_all,bctoll_true,3,3,3)
! orthogonal errors
         errx_all = (atterr(2,3)-atterr(3,2))/2d0
         erry_all = (atterr(3,1)-atterr(1,3))/2d0
         errz_all = (atterr(1,2)-atterr(2,1))/2d0
! non orthogonal errors
         nerrx_all = (atterr(2,3)+atterr(3,2))/2d0
         nerry_all = (atterr(3,1)+atterr(1,3))/2d0
         nerrz_all = (atterr(1,2)+atterr(2,1))/2d0
      endif
!
!   obslat = -dasin(btocest(3,3))*radeg
!   obslon = datan2(btocest(3,2),btocest(3,1))*radeg
!   obslos = datan2(btocest(2,3),btocest(1,3))*radeg
!   obslat_all = -dasin(btocest_all(3,3))*radeg
!   obslon_all = datan2(btocest_all(3,2),btocest_all(3,1))*radeg
!   obslos_all = datan2(btocest_all(2,3),btocest_all(1,3))*radeg
!
!  new setup to match ball dot layout 10-20-06
!
      obslat = -dasin(btocest(3,2))*radeg
      obslon = datan2(btocest(3,3),-btocest(3,1))*radeg
      obslos = datan2(btocest(2,2),btocest(1,2))*radeg
      obslat_all = -dasin(btocest_all(3,2))*radeg
```

```
      obslon_all = datan2(btocest_all(3,3),-btocest_all(3,1))*radeg
      obslos_all = datan2(btocest_all(2,2),btocest_all(1,2))*radeg
!
! changed to ball to case 1-23-07
!
!     obslat = -dasin(btocest(3,1))*radeg
!     obslon = datan2(btocest(3,3),btocest(3,2))*radeg
!     obslos = datan2(btocest(1,1),btocest(2,1))*radeg
!     obslat_all = -dasin(btocest_all(3,1))*radeg
!     obslon_all = datan2(btocest_all(3,3),btocest_all(3,2))*radeg
!     obslos_all = datan2(btocest_all(1,1),btocest_all(1,2))*radeg
      if (screen) then
         if (pixelcal) then
            write(6,"('test: ',i6)") ij
         else
            write(6,"('test: ',i6)") i
         endif
         write(6,"('time: ',f15.4)") time
         write(6,"('true observation lat, lon, los: ',3f10.5)")
   lat1*radeg,lon1*radeg,los1*radeg
         write(6,"('estimated lat, lon, los: ',3f12.5)")
   obslat,obslon,obslos
         write(6,"('estimated lat, lon, los (all points):
   ',3f12.5)") obslat_all,obslon_all,obslos_all
         write(6,"('ball offset x,y: ',3f10.5)") offx,offy
         write(6,"('dotx and doty for point1: ',2f10.5)")
   dotx(point1),doty(point1)
         write(6,"('dotx and doty for point2: ',2f10.5)")
   dotx(point2),doty(point2)
         write(6,"('dotx and doty for point3: ',2f10.5)")
   dotx(point3),doty(point3)
         write(6,"('true points are: ')")
         write(6,*) (dotnum(jj),jj=1,ndotin)
         write(6,"('matched points are: ')")
         write(6,*) (pid(jj),jj=1,ndotin)
         write(6,"('search points used are: ')")
         write(6,*) cp1,cp2,cp3
!        write(6,"('search error: ',e20.10)") error
!        write(6,"('permutation of errors: ',3e20.10)") ep1,ep2,ep3
         write(6,"('orthogonality error: ',e20.10)") minerr
         write(6,"('pseudo inverse error: ',e20.10)") pserr
         write(6,"('orthogonal angle errors: ',3f10.3)")
   errx*radeg*3600d0,erry*radeg*3600,errz*radeg*3600
         write(6,"('orthogonal angle errors for all: ',3f10.3)")
   errx_all*radeg*3600d0,erry_all*radeg*3600,errz_all*radeg*3600
         write(6,"('')")
         write(6,"('estimated b2c transformation: ')")
         write(6,"(3f12.8)") (btocest(1,j),j=1,3)
         write(6,"(3f12.8)") (btocest(2,j),j=1,3)
         write(6,"(3f12.8)") (btocest(3,j),j=1,3)
         write(6,"('')")
         write(6,"('estimated b2c transformation from all points in
   view: ')")
         write(6,"(3f12.8)") (btocest_all(1,j),j=1,3)
         write(6,"(3f12.8)") (btocest_all(2,j),j=1,3)
         write(6,"(3f12.8)") (btocest_all(3,j),j=1,3)
         write(6,"('')")
```

```
            write(6,"('true b2c transformation: ')")
            write(6,"(3f12.8)") (bctoll_true(1,j),j=1,3)
            write(6,"(3f12.8)") (bctoll_true(2,j),j=1,3)
            write(6,"(3f12.8)") (bctoll_true(3,j),j=1,3)
            write(6,"('')")
            write(6,"('error in b2c transformation: ')")
            write(6,"(3f12.8)") (atterr(1,j),j=1,3)
            write(6,"(3f12.8)") (atterr(2,j),j=1,3)
            write(6,"(3f12.8)") (atterr(3,j),j=1,3)
            write(6,"('')")
!           write(6,*) mink,minii
!           write(6,*) mnkc,mxkc
            write(6,*) pass
            write(6,"('')")
            write(6,*) meanx,meany
            write(6,*) sigx,sigy
            write(6,"('')")
            if (flagpause) pause
         else
            if (pixelcal) then
               write(6,"('test: ',i6)") ij
            else
               write(6,"('test: ',i6,1x,'ndotin: ',i4)") i,ndotin
               write(6,*) pass
            endif
         endif
         kpass = kpass + pass
         if (pixelcal) then
             output(1) = ij
         else
             output(1) = time
         endif
         output(2) = maxk
         output(3) = mxkc
         output(4) = error
         output(5) = dotnum(point1)
         output(6) = dotnum(point2)
         output(7) = dotnum(point3)
         output(8) = cp1
         output(9) = cp2
         output(10) = cp3
         output(11) = minp1
         output(12) = minp2
         output(13) = minp3
         output(14) = lat1
         output(15) = lon1
         output(16) = los1
         output(17) = mink
         output(18) = minii
         output(19) = coldstart
         output(20) = ndotin
         output(21) = pserr
         output(22) = pass
         output(23) = errx
         output(24) = erry
         output(25) = errz
         output(26) = errx_all
```

```
      output(27) = erry_all
      output(28) = errz_all
      output(29) = minjp1
      output(30) = kpass
      output(31) = minerr
      do j=1,3
         do k=1,3
            output(31+(j-1)*3+k) = btocest(j,k)
         enddo
      enddo
      output(41) = obslat
      output(42) = obslon
      output(43) = obslos
      output(44) = obslat_all
      output(45) = obslon_all
      output(46) = obslos_all
      output(47) = meanx
      output(48) = meany
      output(49) = sigx
      output(50) = sigy
      output(51) = maxrange
!
      write(100,*) time
      write(100,*) ndotin
      write(100,*) nmapin
      do j=1,ndotin
         write(100,*) dotx(j),doty(j)
      enddo
      do j=1,nmapin
         write(100,*) mapx(j),mapy(j)
      enddo
!
      if (.not. nogood .and. minerr .lt. 0.03d0)
write(30,"(51e20.10)") output
!     write(30,"(50e20.10)") output
1234 continue
enddo
write(6,*) kpass
!do i=1,ndot
!   if (newang(i,3) .ne. 0d0) then
!        write(6,"('')")
!      newang(i,1) = newang(i,1)/newang(i,3)
!      newang(i,2) = newang(i,2)/newang(i,3)
!        write(6,*) i,dotlat(i),dotlon(i)
!        write(6,*) newang(i,1),newang(i,2),newang(i,3)
!        write(6,"('')")
!        dotlat(i) = newang(i,1)
!        dotlon(i) = newang(i,2)
!   endif
!enddo
!rewind (101)
close (30)
close (20)
close (100)
!kpass = 0
!goto 543
end
```

```
!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!
subroutine sideratios(side,ratio1,ratio2,maxside)
implicit none
real*8 side(3),ratio1,ratio2,maxside,minside,midside
maxside = dmax1(side(1),side(2),side(3))
minside = dmin1(side(1),side(2),side(3))
if (maxside .eq. side(1) .and. minside .eq. side(2)) midside =
side(3)
if (maxside .eq. side(1) .and. minside .eq. side(3)) midside =
side(2)
if (maxside .eq. side(2) .and. minside .eq. side(1)) midside =
side(3)
if (maxside .eq. side(2) .and. minside .eq. side(3)) midside =
side(1)
if (maxside .eq. side(3) .and. minside .eq. side(1)) midside =
side(2)
if (maxside .eq. side(3) .and. minside .eq. side(2)) midside =
side(1)
ratio1 = minside/maxside
ratio2 = midside/maxside
return
end
!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!
subroutine bctofov_3axis(bctoll,lat,lon,los)
implicit none
real*8 bctoll(3,3),lat,lon,los
!bctoll(1,1) = dsin(lat)*dcos(lon)*dcos(los)-dsin(los)*dsin(lon)
!bctoll(1,2) = -dsin(lat)*dsin(lon)*dcos(los)-dsin(los)*dcos(lon)
!bctoll(1,3) = -dcos(lat)*dcos(los)
!bctoll(2,1) = dsin(lon)*dcos(los)+dsin(los)*dsin(lat)*dcos(lon)
!bctoll(2,2) = dcos(lon)*dcos(los)-dsin(los)*dsin(lat)*dsin(lon)
!bctoll(2,3) = -dsin(los)*dcos(lat)
!bctoll(3,1) = dcos(lat)*dcos(lon)
!bctoll(3,2) = -dsin(lon)*dcos(lat)
!bctoll(3,3) = dsin(lat)
!bctoll(1,1) = -dsin(lat)*dcos(lon)*dcos(los)+dsin(los)*dsin(lon)
!bctoll(1,2) = -dsin(lat)*dsin(lon)*dcos(los)-dsin(los)*dcos(lon)
!bctoll(1,3) = dcos(lat)*dcos(los)
!bctoll(2,1) = -dsin(lon)*dcos(los)-dsin(los)*dsin(lat)*dcos(lon)
!bctoll(2,2) = dcos(lon)*dcos(los)-dsin(los)*dsin(lat)*dsin(lon)
!bctoll(2,3) = dsin(los)*dcos(lat)
!bctoll(3,1) = -dcos(lat)*dcos(lon)
!bctoll(3,2) = -dsin(lon)*dcos(lat)
!bctoll(3,3) = -dsin(lat)
!
! new setup to match ball dot layout 10-20-06
!
bctoll(1,1) = -dsin(lat)*dcos(lon)*dcos(los)+dsin(los)*dsin(lon)
bctoll(1,2) = dcos(lat)*dcos(los)
bctoll(1,3) = dsin(lat)*dsin(lon)*dcos(los)+dsin(los)*dcos(lon)
bctoll(2,1) = -dsin(lon)*dcos(los)-dsin(los)*dsin(lat)*dcos(lon)
bctoll(2,2) = dsin(los)*dcos(lat)
bctoll(2,3) = -dcos(lon)*dcos(los)+dsin(los)*dsin(lat)*dsin(lon)
bctoll(3,1) = -dcos(lat)*dcos(lon)
bctoll(3,2) = -dsin(lat)
```

```
bctoll(3,3) = dsin(lon)*dcos(lat)
return
end
!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!
subroutine calcbc_new(bc,lat,lon,radius)
real*8 bc(3),radius,lat,lon
!bc(1) = radius*dcos(lat)*dcos(lon)
!bc(2) = radius*dcos(lat)*dsin(lon)
!bc(3) = radius*dsin(lat)
!
! new setup to match ball dot layout 10-20-06
!
bc(1) = radius*dcos(lat)*dcos(lon)
bc(2) = radius*dsin(lat)
bc(3) = -radius*dsin(lon)*dcos(lat)
return
end
!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!
! great circle distance between points defined by the tips of
unit vectors up1 and up2
subroutine gcd(up1,up2,gcdout)
implicit none
real*8
up1(3),up2(3),gcdout,a2(3),a3(3),dcm(3,3),u2(3),a2mag,a3mag,a2mag
2,a3mag2
integer*4 i
! define frame with axis 1 along up1, axis 2 the cross product of
up1 and up2, and 3 the product of up1 and axis 2
! a2 = up1 cross up2
call acrosb(a2,up1,up2)
! make a2 a unit vector
a2mag2 = a2(1)**2+a2(2)**2+a2(3)**2
if (a2mag2 .gt. 1d-10) then
   a2mag = dsqrt(a2mag2)
   do i=1,3
      a2(i) = a2(i)/a2mag
   enddo
else
   gcdout = 0d0
   return
endif
! a3 = up1 cross a2
call acrosb(a3,up1,a2)
! make a3 a unit vector
a3mag2 = a3(1)**2+a3(2)**2+a3(3)**2
if (a3mag2 .gt. 1d-10) then
   a3mag = dsqrt(a3mag2)
   do i=1,3
      a3(i) = a3(i)/a3mag
   enddo
else
   gcdout = 0d0
   return
endif
```

```
! calculate the dcm to go from ref frame to new frame defined
above
do i=1,3
   dcm(1,i) = up1(i)
   dcm(2,i) = a2(i)
   dcm(3,i) = a3(i)
enddo
! calculate up2 in new frame
call axb(u2,dcm,up2,3,3,1)
! calculate the great circle angle between up1 and up2, which is
about u2 in new axes system
gcdout = dabs(datan2(u2(3),u2(1)))
return
end
!
! determinant of 3*3 matrix
subroutine det3(a,det)
implicit none
real*8 a(3,3),det
det = a(1,1)*(a(2,2)*a(3,3)-a(2,3)*a(3,2)) -
a(1,2)*(a(2,1)*a(3,3)-a(2,3)*a(3,1)) + a(1,3)*(a(2,1)*a(3,2)-
a(2,2)*a(3,1))
return
end
!
subroutine
calc_closest(dotlat,dotlon,ballrad,ndot,closest,nclose,fovsize)
implicit none
integer*4 ndot,nclose,i,j,closest(3000,nclose),distorder(3000)
real*8
dotlat(3000),dotlon(3000),ballrad,bc(3),distance(3000),fovsize,di
stord(3000),bc1(3),dist
logical found
do i=1,ndot
! calculate distance to other dots
! unit vector to dot in ball center frame
   call calcbc_new(bc,dotlat(i),dotlon(i),1d0)
   do j=1,ndot
! unit vector dot in ball center frame
      call calcbc_new(bc1,dotlat(j),dotlon(j),1d0)
! great circle distance between points in radians
      call gcd(bc,bc1,dist)
! distance scaled with ball radius
      distance(j) = dist*ballrad
   enddo
! distances in ascending order
   call order(distance,distord,distorder,ndot,3000)
! use first nclose closest, ignoring the first which is when i =
j
   do j=1,nclose
      closest(i,j) = distorder(j+1)
   enddo
   if (distord(nclose+1) .lt. dsqrt(2d0)*fovsize) write(6,*)
i,distord(nclose+1)
enddo
return
end
```

```fortran
!
subroutine order(in,out,ind,n,m)
use dflib
implicit none
integer*4 n,m,i,j,ncopy,ind(m)
real*8 in(m),out(m),dum(m)
! sort in ascending order
ncopy = n
do i=1,n
   out(i) = in(i)
enddo
call sortqq(loc(out),ncopy,srt$real8)
if (n .ne. ncopy) then
   print*,'error in order subroutine'
   stop
endif
! identify index numbers in ascending order
do i=1,n
   do j=1,n
      if(out(i) .eq. in(j)) then
         ind(i) = j
      endif
   enddo
enddo
return
end
subroutine pseudoinv(matin,matout,n,m,p,err)
implicit none
integer*4 n,m,p,i,j
real*8
matin(n,m),matout(m,n),dum(n,n),dumi(n,n),matint(m,n),prod(n,n),e
rr
call dtran(matin,matint,n,p,n,m,m,n)
call dmult(matin,matint,dum,n,p,n,n,m,m,n,n,n)
call dinvrt(dum,dumi,n,n)
call dmult(matint,dumi,matout,p,n,n,m,n,n,n,m,n)
call dmult(matin,matout,prod,n,p,n,n,m,m,n,n,n)
err = 0d0
do i=1,n
   do j=1,n
       if (i .ne. j) then
        err = err + prod(i,j)**2
       else
          err = err + (prod(i,j) - 1d0)**2
       endif
   enddo
enddo
return
end
!!!!!!!!!!!!!!!!!!!!!!!!!!!!!!!!!!!!!!!!!!!!!!!!!!!!!!!!!!!!!!!!!!
!!!!!!!!!!!!!!!!!!!!!!!!!!!!!!!!!!!!!!!!!!!!!!!!!!!!!!!!!!!!
subroutine calcang_new(bc,lat,lon,radius)
real*8 bc(3),radius,lat,lon
!
! new setup to match ball dot layout 10-20-06
!
lon = datan2(-bc(3),bc(1))
```

```
lat = dasin(bc(2)/radius)
return
end
```

What is claimed is:

1. A method for determining the angular position of an object, comprising the steps of:
    obtaining data representing an image of a surface area of the object, the image including a plurality of dots;
    determining a set of coordinates for each dot of the plurality of dots;
    selecting a predetermined number of dots of the plurality of dots;
    comparing the predetermined number of dots with a plurality of dots stored in a dot map;
    responsive to the comparing step, if the predetermined number of dots substantially match the plurality of dots stored in the dot map, selecting the predetermined number of dots; and
    forming a coordinate transformation matrix representing a transformation from a coordinate frame associated with a position of the predetermined number of dots at the surface of the object to a coordinate frame associated with a position of the image of the surface area of the object.

2. The method of claim 1, wherein the comparing step further comprises the steps of:
    forming a plurality of object-to-image coordinate transformation matrices;
    determining if at least one object-to-image coordinate transformation matrix describes an orthogonal right-handed rotation;
    if at least one object-to-image coordinate transformation matrix describes the orthogonal right-handed rotation, selecting the at least one object-to-image transformation matrix; and
    using the selected at least one object-to-image transformation matrix to perform the comparing step with a second plurality of dots stored in the map.

3. The method of claim 2, wherein the plurality of object-to-image coordinate transformation matrices comprises six ball coordinate frame to camera case coordinate frame direction cosine matrices.

4. The method of claim 1, wherein the plurality of dots comprise a plurality of bumps on the surface of the object.

5. The method of claim 1, wherein the coordinate transformation matrix is expressed as $[B2C]=[uv1\ uv2\ uv3][muv1\ muv2\ muv3]^{-1}$, wherein unit vectors for dots in the view of a camera are expressed as (uv1, uv2, uv3), and unit vectors for dots stored in the map are as expressed as (muv1, muv2, muv3).

6. The method of claim 1, further comprising the steps of:
    responsive to the comparing step, if the predetermined number of dots do not match the plurality of dots stored in the dot map, selecting a second predetermined number of dots of the plurality of dots; and
    comparing the second predetermined number of dots with the plurality of dots stored in the dot map.

7. The method of claim 1, wherein the steps are performed by a digital processor unit.

8. The method of claim 1, wherein the data representing the image of the surface area of the object is received from a digital camera.

9. The method of claim 1, wherein the object is substantially spherically-shaped.

10. The method of claim 1, wherein the object is an attitude determination ball in an angular readout system.

11. The method of claim 1, wherein the object is a spherical object or a non-spherical object.

12. The method of claim 1, wherein the steps are executed as a plurality of software instructions by a digital processor unit.

13. The method of claim 1, wherein the plurality of dots comprise a plurality of indentations in the surface of the object.

14. A method for determining the attitude of a moving ball-shaped object, comprising the steps of:
    obtaining image data from a digital camera, the data representing an image of a surface area of the ball-shaped object, the image including a plurality of dots on a surface of the ball-shaped object;
    determining a set of coordinates for dot of the plurality of dots;
    selecting three dots of the plurality of dots;
    calculating a plurality of polar coordinates for each of the three dots;
    comparing the polar coordinates for each of the three dots with polar coordinates for three dots stored in a predetermined map;
    responsive to the comparing step, if the polar coordinates of the three dots substantially match the dots stored in the map, selecting the polar coordinates of the dots; and
    forming a coordinate transformation matrix representing a transformation from a coordinate frame associated with an attitude of the dots at the surface of the object to a coordinate frame associated with a position of the image of the surface area of the ball-shaped object.

15. The method of claim 14, wherein the coordinate transformation matrix comprises at least one direction cosine matrix.

16. A system for determining the angular position of an object, comprising:
    a digital camera; and
    a digital processor unit coupled to the digital camera and configured to:
    receive, from the digital camera, data representing an image of a surface area of the object, the image including a plurality of dots;
    determine a set of coordinates for each dot of the plurality of dots;
    select a predetermined number of dots of the plurality of dots;
    retrieve a stored plurality of dots;
    compare the predetermined number of dots with the retrieved plurality of dots;
    if the predetermined number of dots substantially match the plurality of retrieved dots, select the predetermined number of dots; and
    form a coordinate transformation matrix representing a transformation from a coordinate frame associated with an attitude of the predetermined number of dots at the surface of the object to a coordinate frame associated with an attitude of the image of the surface area of the object.

17. The system of claim 16, wherein digital processor unit is further configured to:
    form a plurality of object-to-image coordinate transformation matrices;
    determine if at least one object-to-image coordinate transformation matrix describes an orthogonal right-handed rotation;
    if at least one object-to-image coordinate transformation matrix describes the orthogonal right-handed rotation, select the at least one object-to-image transformation matrix; and use the selected at least one object-to-image transformation matrix to perform the comparing with a second plurality of retrieved dots.

18. The system of claim 17, wherein the plurality of object-to-image coordinate transformation matrices comprises six ball coordinate frame to camera case coordinate frame direction cosine matrices.

19. The system of claim 16, wherein the object is a ball-shaped mechanism for reading an attitude of a craft in flight.

20. The system of claim 16, wherein the object is a non-spherical object, and the system is a part of a scanner system for viewing the object on an assembly line.

* * * * *